US012689857B2

(12) United States Patent
Lee et al.

(10) Patent No.: US 12,689,857 B2
(45) Date of Patent: Jul. 21, 2026

(54) HYBRID SUPPORTED ACOUSTIC MEMBRANE ASSEMBLY

(71) Applicant: W. L. Gore & Associates, Inc., Newark, DE (US)

(72) Inventors: Seong Woo Lee, Newark, DE (US); Jason Manthey, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 214 days.

(21) Appl. No.: 18/286,597

(22) PCT Filed: Apr. 15, 2021

(86) PCT No.: PCT/US2021/027540
§ 371 (c)(1),
(2) Date: Oct. 12, 2023

(87) PCT Pub. No.: WO2022/220834
PCT Pub. Date: Oct. 20, 2022

(65) Prior Publication Data
US 2024/0205606 A1 Jun. 20, 2024

(51) Int. Cl.
*H04R 29/00* (2006.01)
*B32B 3/26* (2006.01)
(Continued)

(52) U.S. Cl.
CPC .............. *H04R 7/18* (2013.01); *B32B 3/266* (2013.01); *B32B 7/12* (2013.01); *B32B 15/085* (2013.01);
(Continued)

(58) Field of Classification Search
CPC . H04R 7/18; H04R 7/04; H04R 29/00; H04R 2307/021; H04R 1/023; H04R 1/44;
(Continued)

(56) References Cited

U.S. PATENT DOCUMENTS 6,512,834 B1  1/2003 Banter et al.
2017/0006369 A1* 1/2017 Kenaley ................... B32B 5/02
(Continued)

FOREIGN PATENT DOCUMENTS

JP        H05236598 A  *  9/1993

OTHER PUBLICATIONS

International Preliminary Report on Patentability received for PCT Patent Application No. PCT/US2021/27540, mailed on Oct. 26, 2023, 9 pages.
(Continued)

*Primary Examiner* — Joseph Saunders, Jr.

(57) ABSTRACT

An assembly (10) includes a first support member (15) having a plurality of first apertures (50); a second support member (20) having a plurality of second apertures (55); and a polymer membrane (25) disposed between the first support member (15) and the second support member (20). The polymer membrane (25) is spaced from the first support member (15) by a first distance (30) and from the second support member (20) by a second distance (35). Each of the first distance or the second distance is from 10 μm to 100 μm. The assembly provides a standard deviation of insertion loss of 0.8 dB or less over a frequency range of 200 Hz to 10,000 Hz after a water entry pressure (WEP) test.

18 Claims, 5 Drawing Sheets

(51) Int. Cl.

| | |
|---|---|
| *B32B 7/12* | (2006.01) |
| *B32B 15/085* | (2006.01) |
| *B32B 27/08* | (2006.01) |
| *B32B 27/32* | (2006.01) |
| *B32B 27/36* | (2006.01) |
| *H04R 7/04* | (2006.01) |
| *H04R 7/18* | (2006.01) |

(52) U.S. Cl.
CPC ............ *B32B 27/08* (2013.01); *B32B 27/322* (2013.01); *B32B 27/36* (2013.01); *H04R 7/04* (2013.01); *H04R 29/00* (2013.01); *B32B 2307/10* (2013.01); *B32B 2307/54* (2013.01); *B32B 2457/00* (2013.01); *H04R 2307/021* (2013.01)

(58) Field of Classification Search
CPC ......... B32B 3/266; B32B 7/12; B32B 15/085; B32B 27/08; B32B 27/322; B32B 27/36; B32B 2307/10; B32B 2307/54; B32B 2457/00; B32B 2262/101; B32B 5/02; B32B 15/08; B32B 17/02; B32B 27/288; B32B 27/32; B32B 27/34; B32B 27/40; C08J 5/18; C08J 2327/18

See application file for complete search history.

(56) References Cited

U.S. PATENT DOCUMENTS

| | | | |
|---|---|---|---|
| 2017/0041706 A1* | 2/2017 | Evans | H04R 1/086 |
| 2018/0242079 A1 | 8/2018 | Seo | |
| 2019/0268692 A1* | 8/2019 | Zero | G01F 1/36 |
| 2020/0107096 A1* | 4/2020 | Minervini | B81B 7/0006 |
| 2021/0067851 A1 | 3/2021 | Fukushima et al. | |

OTHER PUBLICATIONS

International Search Report and Written Opinion received for PCT Patent Application No. PCT/US2021/27540, mailed on Jan. 21, 2022, 13 pages.

* cited by examiner

HYBRID SUPPORTED ACOUSTIC MEMBRANE ASSEMBLY

CROSS-REFERENCE TO RELATED APPLICATION

This application is a national phase application of PCT Application No. PCT/US2021/027540, internationally filed on Apr. 15, 2021, which is herein incorporated by reference in its entirety for all purposes.

FIELD

This disclosure relates generally to acoustic membrane assemblies. More specifically, this disclosure relates to a hybrid supported acoustic membrane assembly.

BACKGROUND

Acoustic membrane assemblies can allow sound to propagate through and past a membrane and to and from an acoustic device. Acoustic membranes can also prevent ingress of water, dust, and other contaminants.

SUMMARY

In some embodiments, an assembly includes a first support member having a plurality of first apertures; a second support member having a plurality of second apertures; and a polymer membrane disposed between the first support member and the second support member. In some embodiments, the polymer membrane is spaced from the first support member by a first distance and is spaced from the second support member by a second distance. In some embodiments, the first distance is from 10 μm to 100 μm and the second distance is from 10 μm to 100 μm. In some embodiments, the assembly is configured to provide a standard deviation of insertion loss of 0.8 dB or less over a frequency range of 200 Hz to 10,000 Hz after a water entry pressure (WEP) test.

In some embodiments, an assembly includes an acoustic device; a first support member having a plurality of first apertures; a second support member having a plurality of second apertures; and a polymer membrane disposed between the first support member and the second support member. In some embodiments, the polymer membrane is spaced from the first support member by a first distance and is spaced from the second support member by a second distance. In some embodiments, the first distance is from 10 μm to 100 μm and the second distance is from 10 μm to 100 μm. In some embodiments, the assembly is configured to provide a standard deviation of insertion loss of 0.8 dB or less over a frequency range of 200 Hz to 10,000 Hz after a water entry pressure (WEP) test.

In some embodiments, the polymer membrane includes an expanded polytetrafluoroethylene (ePTFE).

In some embodiments, at least one of the first support member or the second support member, or any combination thereof, can include a metal, a polymer, fiberglass, or any combination thereof.

In some embodiments, a diameter of at least one aperture of the plurality of first apertures is from 1 μm to 200 μm and a diameter of at least one aperture of the plurality of second apertures is from 1 μm to 200 μm.

In some embodiments, at least one of the plurality of first apertures includes 90 to 100 apertures or the plurality of second apertures includes 5 to 10 apertures. In some embodiments, the plurality of first apertures includes 90 to 100 apertures and the plurality of second apertures includes 5 to 10 apertures.

In some embodiments, the first distance is defined by a thickness of a first adhesive and the second distance is defined by a thickness of a second adhesive.

In some embodiments, the first support member and the second support member can be different.

In some embodiments, at least one of a thickness of the first support member is from 100 μm to 130 μm or a thickness of the second support member is from 250 μm to 300 μm. In some embodiments, a thickness of the first support member is from 100 μm to 130 μm and a thickness of the second support member is from 250 μm to 300 μm.

In some embodiments, at least one of the first support member is a rigid body that does not deform under 3 bar of water pressure; or the second support member is a rigid body that does not deform under 3 bar of water pressure.

In some embodiments, the assembly can be configured to provide a standard deviation of insertion loss of 0.05 dB to 0.8 dB over a frequency range of 200 Hz to 10,000 Hz after a WEP test.

In some embodiments, the second support member is thicker than the first support member.

In some embodiments, the acoustic device is a speaker, a receiver, or any combination thereof.

In some embodiments, the WEP test is conducted at 43.5 psi (3 bar) and has a ramp rate of 0.16 psi per second.

In some embodiments, an assembly includes a first support member having a plurality of first apertures; a second support member having a plurality of second apertures; and a polymer membrane disposed between the first support member and the second support member. In some embodiments, the polymer membrane is spaced from the first support member by a first distance and is spaced from the second support member by a second distance. In some embodiments, the first distance is from 10 μm to 100 μm and the second distance is from 10 μm to 100 μm. In some embodiments, the assembly is configured to provide a standard deviation of insertion loss of 0.8 dB or less over a frequency range of 200 Hz to 10,000 Hz after a water entry pressure (WEP) test conducted at 43.5 psi (3 bar) and has a ramp rate of 0.16 psi per second.

BRIEF DESCRIPTION OF THE DRAWINGS

Reference is made to the drawings that form a part of this disclosure, and which illustrate embodiments in which the devices and methods described herein can be practiced.

Like reference numbers represent like parts throughout.

DETAILED DESCRIPTION

Figure 1:
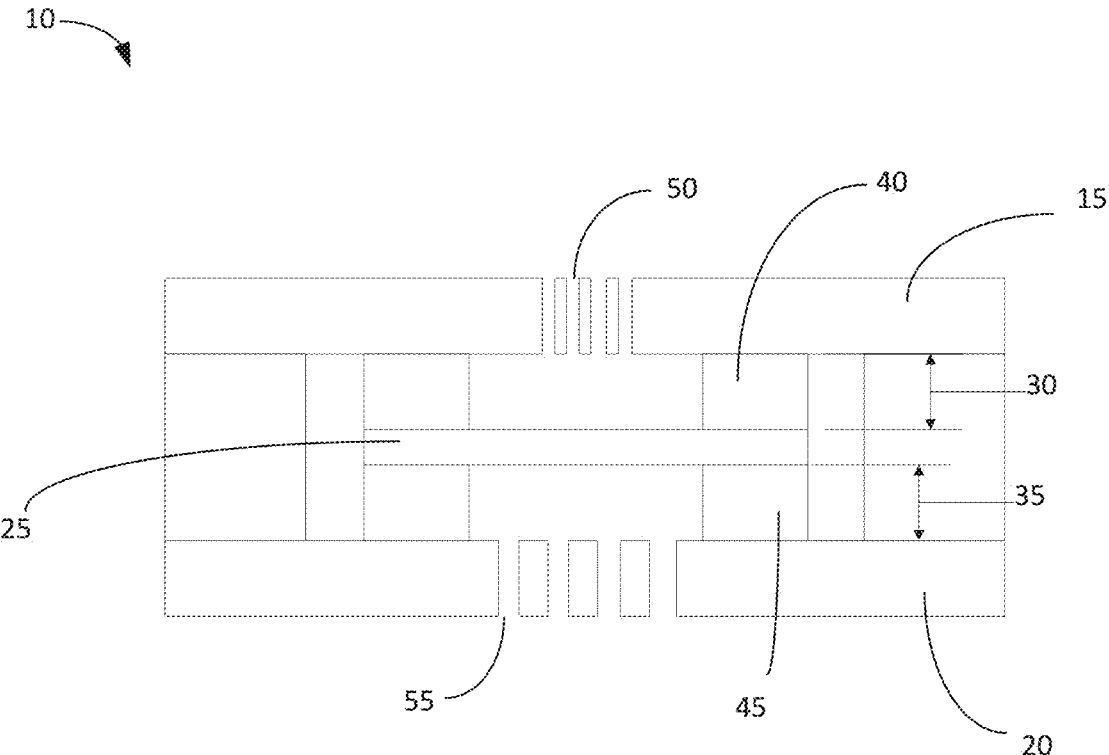
FIG. 1 illustrates an assembly, according to some embodiments.

There is an ongoing need for improved acoustic membranes. Some embodiments described herein can advantageously achieve a low acoustic loss and variability while providing mechanical protection for deep immersion (5 bar)

applications. Some embodiments described herein can advantageously avoid overstretching of the membrane, providing for similar performance of the acoustic membrane overtime. That is, avoiding overstretching of the membrane can provide for a reduction in performance degradation over time.

Some embodiments of the present disclosure are directed to a predominantly reactive supported acoustic membrane that includes a polymer membrane, a first support member on a first side of the polymer membrane, and a second support member on a second side of the polymer membrane.

Some embodiments of this disclosure, during a water immersion challenge, can limit permanent deformation of the polymer membrane in a direction of water entry (via the second support member), while the first support member limits permanent deformation of the polymer membrane in a direction opposite the direction of water entry. The presence of the first and second support members can result in a lower acoustic variability after an immersion challenge. Spacing between the first support member and the polymer membrane and between the second support member and the polymer membrane allow the polymer membrane to vibrate and maintain a predominantly reactive mode of sound transmission. The spacing also limits a total available distance and prevents the polymer membrane from permanent deformation prior to the polymer membrane contacting either support member under immersion.

In some embodiments, a size and number of apertures in the two support members can be controlled to change the total effective acoustic resistance of the system and achieve a flat curve shape and low insertion loss over the entire desired frequency range.

In some embodiments, the polymer membrane in the assembly includes a plurality of pores. In some embodiments, the plurality of pores can have a maximum pore size. As used herein, "maximum pore size," is the size of the largest pore of the plurality of pores.

In some embodiments, the plurality of pores can have a maximum pore size of 0.1 μm to 30 μm. In some embodiments, the plurality of pores can have a maximum pore size of 0.3 μm to 30 μm. In some embodiments, the plurality of pores can have a maximum pore size of 0.5 μm to 30 μm. In some embodiments, the plurality of pores can have a maximum pore size of 10 μm to 30 μm. In some embodiments, the plurality of pores can have a maximum pore size of 20 μm to 30 μm. In some embodiments, the plurality of pores can have a maximum pore size of 25 μm to 30 μm.

In some embodiments, the plurality of pores can have a maximum pore size of 0.2 μm to 8 μm. In some embodiments, the plurality of pores can have a maximum pore size of 0.4 μm to 4 μm. In some embodiments, the plurality of pores can have a maximum pore size of 0.8 μm to 2 μm. In some embodiments, the plurality of pores can have a maximum pore size of 1 μm to 1.6 μm.

In some embodiments, the plurality of pores can have a maximum pore size of 0.2 μm to 4 μm. In some embodiments, the plurality of pores can have a maximum pore size of 0.2 μm to 2 μm. In some embodiments, the plurality of pores can have a maximum pore size of 0.2 μm to 1.6 μm. In some embodiments, the plurality of pores can have a maximum pore size of 0.2 μm to 1 μm. In some embodiments, the plurality of pores can have a maximum pore size of 0.2 μm to 0.8 μm. In some embodiments, the plurality of pores can have a maximum pore size of 0.2 μm to 0.4 μm.

In some embodiments, the plurality of pores can have a maximum pore size of 0.4 μm to 8 μm. In some embodiments, the plurality of pores can have a maximum pore size of 0.8 μm to 8 μm. In some embodiments, the plurality of pores can have a maximum pore size of 1 μm to 8 μm. In some embodiments, the plurality of pores can have a maximum pore size of 1.6 μm to 8 μm. In some embodiments, the plurality of pores can have a maximum pore size of 2 μm to 8 μm. In some embodiments, the plurality of pores can have a maximum pore size of 4 μm to 8 μm.

In some embodiments, the polymer membrane has a thickness ranging from 0.06 μm to 130 μm. In some embodiments, the polymer membrane has a thickness ranging from 0.12 μm to 65 μm. In some embodiments, the polymer membrane has a thickness ranging from 0.24 μm to 30 μm. In some embodiments, the polymer membrane has a thickness ranging from 0.5 μm to 15 μm. In some embodiments, the polymer membrane has a thickness ranging from 1 μm to 8 μm. In some embodiments, the polymer membrane has a thickness ranging from 2 μm to 4 μm.

In some embodiments, the polymer membrane has a thickness ranging from 0.025 μm to 300 μm. In some embodiments, the polymer membrane has a thickness ranging from 0.061 μm to 126 μm. In some embodiments, the polymer membrane has a thickness ranging from 0.025 μm to 150 μm.

In some embodiments, the polymer membrane has a thickness ranging from 0.025 μm to 150 μm. In some embodiments, the polymer membrane has a thickness ranging from 0.025 μm to 100 μm. In some embodiments, the polymer membrane has a thickness ranging from 0.025 μm to 50 μm. In some embodiments, the polymer membrane has a thickness ranging from 0.025 μm to 25 μm. In some embodiments, the polymer membrane has a thickness ranging from 0.025 μm to 10 μm. In some embodiments, the polymer membrane has a thickness ranging from 0.025 μm to 5 μm. In some embodiments, the polymer membrane has a thickness ranging from 0.025 μm to 2.5 μm. In some embodiments, the polymer membrane has a thickness ranging from 0.025 μm to 1 μm. In some embodiments, the polymer membrane has a thickness ranging from 0.025 μm to 0.3 μm.

In some embodiments, the polymer membrane has a thickness ranging from 0.06 μm to 65 μm. In some embodiments, the polymer membrane has a thickness ranging from 0.06 μm to 30 μm. In some embodiments, the polymer membrane has a thickness ranging from 0.06 μm to 15 μm. In some embodiments, the polymer membrane has a thickness ranging from 0.06 μm to 8 μm. In some embodiments, the polymer membrane has a thickness ranging from 0.06 μm to 4 μm. In some embodiments, the polymer membrane has a thickness ranging from 0.06 μm to 2 μm. In some embodiments, the polymer membrane has a thickness ranging from 0.06 μm to 1 μm. In some embodiments, the polymer membrane has a thickness ranging from 0.06 μm to 0.5 μm. In some embodiments, the polymer membrane has a thickness ranging from 0.06 μm to 0.24 μm. In some embodiments, the polymer membrane has a thickness ranging from 0.06 μm to 0.12 μm.

In some embodiments, the polymer membrane has a thickness ranging from 0.12 μm to 130 μm. In some embodiments, the polymer membrane has a thickness ranging from 0.24 μm to 130 μm. In some embodiments, the polymer membrane has a thickness ranging from 0.5 μm to 130 μm. In some embodiments, the polymer membrane has a thickness ranging from 1 μm to 130 μm. In some embodiments, the polymer membrane has a thickness ranging from 2 μm to 130 μm. In some embodiments, the polymer membrane has a thickness ranging from 4 μm to 130 μm. In some embodiments, the polymer membrane has a thickness ranging from 8 μm to 130 μm. In some embodiments, the polymer membrane has a thickness ranging from 15 μm to 130 μm. In some embodiments, the polymer membrane has a thickness ranging from 30 μm to 130 μm. In some embodiments, the polymer membrane has a thickness ranging from 65 μm to 130 μm.

In some embodiments, the polymer membrane has an air flow resistance ranging from 75 to 50,000 Rayls. In some embodiments, the polymer membrane has an air flow resistance ranging from 100 to 50,000 Rayls. In some embodiments, the polymer membrane has an air flow resistance ranging from 200 to 25,000 Rayls. In some embodiments, the polymer membrane has an air flow resistance ranging from 800 to 12,500 Rayls. In some embodiments, the polymer membrane has an air flow resistance ranging from 1,600 to 6,000 Rayls. In some embodiments, the polymer membrane has an air flow resistance ranging from 3,000 to 4,000 Rayls.

In some embodiments, the polymer membrane has an air flow resistance ranging from 200 to 25,000 Rayls. In some embodiments, the polymer membrane has an air flow resistance ranging from 200 to 12,500 Rayls. In some embodiments, the polymer membrane has an air flow resistance ranging from 200 to 6,000 Rayls. In some embodiments, the polymer membrane has an air flow resistance ranging from 200 to 4,000 Rayls. In some embodiments, the polymer membrane has an air flow resistance ranging from 200 to 3,000 Rayls. In some embodiments, the polymer membrane has an air flow resistance ranging from 200 to 1,600 Rayls. In some embodiments, the polymer membrane has an air flow resistance ranging from 200 to 800 Rayls. In some embodiments, the polymer membrane has an air flow resistance ranging from 400 to 800 Rayls.

In some embodiments, the polymer membrane has an air flow resistance ranging from 400 to 50,000 Rayls. In some embodiments, the polymer membrane has an air flow resistance ranging from 800 to 50,000 Rayls. In some embodiments, the polymer membrane has an air flow resistance ranging from 1,600 to 50,000 Rayls. In some embodiments, the polymer membrane has an air flow resistance ranging from 3,000 to 50,000 Rayls. In some embodiments, the polymer membrane has an air flow resistance ranging from 6,000 to 50,000 Rayls. In some embodiments, the polymer membrane has an air flow resistance ranging from 12,500 to 50,000 Rayls. In some embodiments, the polymer membrane has an air flow resistance ranging from 25,000 to 50,000 Rayls.

In some embodiments, the polymer membrane has a Young's Modulus ranging from 1 MPa to 1,000 MPa. In some embodiments, the polymer membrane has a Young's Modulus ranging from 2 MPa to 1,000 MPa. In some embodiments, the polymer membrane has a Young's Modulus ranging from 5 MPa to 1,000 MPa. In some embodiments, the polymer membrane has a Young's Modulus ranging from 10 MPa to 1,000 MPa. In some embodiments, the polymer membrane has a Young's Modulus ranging from 25 MPa to 1,000 MPa. In some embodiments, the polymer membrane has a Young's Modulus ranging from 50 MPa to 1,000 MPa. In some embodiments, the polymer membrane has a Young's Modulus ranging from 100 MPa to 1,000 MPa. In some embodiments, the polymer membrane has a Young's Modulus ranging from 250 MPa to 1,000 MPa. In some embodiments, the polymer membrane has a Young's Modulus ranging from 500 MPa to 1,000 MPa. In some embodiments, the polymer membrane has a Young's Modulus ranging from 750 MPa to 1,000 MPa.

In some embodiments, the polymer membrane has a Young's Modulus ranging from 4 MPa to 360 MPa. In some embodiments, the polymer membrane has a Young's Modulus ranging from 8 MPa to 180 MPa. In some embodiments, the polymer membrane has a Young's Modulus ranging from 16 MPa to 90 MPa. In some embodiments, the polymer membrane has a Young's Modulus ranging from 32 MPa to 45 MPa.

In some embodiments, the polymer membrane has a Young's Modulus ranging from 4 MPa to 360 MPa. In some embodiments, the polymer membrane has a Young's Modulus ranging from 4 MPa to 180 MPa. In some embodiments, the polymer membrane has a Young's Modulus ranging from 4 MPa to 90 MPa. In some embodiments, the polymer membrane has a Young's Modulus ranging from 4 MPa to 45 MPa. In some embodiments, the polymer membrane has a Young's Modulus ranging from 4 MPa to 32 MPa. In some embodiments, the polymer membrane has a Young's Modulus ranging from 4 MPa to 16 MPa. In some embodiments, the polymer membrane has a Young's Modulus ranging from 4 MPa to 8 MPa.

In some embodiments, the polymer membrane has a Young's Modulus ranging from 8 MPa to 360 MPa. In some embodiments, the polymer membrane has a Young's Modulus ranging from 16 MPa to 360 MPa. In some embodiments, the polymer membrane has a Young's Modulus ranging from 32 MPa to 360 MPa. In some embodiments, the polymer membrane has a Young's Modulus ranging from 45 MPa to 360 MPa. In some embodiments, the polymer membrane has a Young's Modulus ranging from 90 MPa to 360 MPa. In some embodiments, the polymer membrane has a Young's Modulus ranging from 180 MPa to 360 MPa.

In some embodiments, the polymer membrane has a bubble point ranging from 0.4 psi to 120 psi. In some embodiments, the polymer membrane has a bubble point ranging from 0.4 psi to 100 psi. In some embodiments, the polymer membrane has a bubble point ranging from 0.4 psi to 80 psi. In some embodiments, the polymer membrane has a bubble point ranging from 0.4 psi to 60 psi. In some embodiments, the polymer membrane has a bubble point ranging from 0.4 psi to 40 psi. In some embodiments, the polymer membrane has a bubble point ranging from 0.4 psi to 20 psi. In some embodiments, the polymer membrane has a bubble point ranging from 0.4 psi to 10 psi. In some embodiments, the polymer membrane has a bubble point ranging from 0.4 psi to 5 psi. In some embodiments, the polymer membrane has a bubble point ranging from 0.4 psi to 2 psi. In some embodiments, the polymer membrane has a bubble point ranging from 0.4 psi to 1 psi. In some embodiments, the polymer membrane has a bubble point ranging from 0.4 psi to 0.5 psi.

In some embodiments, the polymer membrane has a bubble point ranging from 1.5 psi to 56 psi. In some embodiments, the polymer membrane has a bubble point ranging from 1.5 psi to 60 psi. In some embodiments, the polymer membrane has a bubble point ranging from 3 psi to 28 psi. In some embodiments, the polymer membrane has a bubble point ranging from 6 psi to 16 psi.

In some embodiments, the polymer membrane has a bubble point ranging from 1.5 psi to 28 psi. In some embodiments, the polymer membrane has a bubble point ranging from 1.5 psi to 14 psi. In some embodiments, the polymer membrane has a bubble point ranging from 1.5 psi to 7 psi. In some embodiments, the polymer membrane has a bubble point ranging from 1.5 psi to 3.5 psi.

In some embodiments, the polymer membrane has a bubble point ranging from 3 psi to 56 psi. In some embodiments, the polymer membrane has a bubble point ranging from 3 psi to 28 psi. In some embodiments, the polymer membrane has a bubble point ranging from 3 psi to 14 psi. In some embodiments, the polymer membrane has a bubble point ranging from 3 psi to 7 psi.

In some embodiments, the polymer membrane has a mass per unit area ranging from $0.01$ $g/m^2$ to $7.5$ $g/m^2$. In some embodiments, the polymer membrane has a mass per unit area ranging from $0.05$ $g/m^2$ to 5 $g/m^2$. In some embodiments, the polymer membrane has a mass per unit area ranging from $0.1$ $g/m^2$ to 2 $g/m^2$. In some embodiments, the polymer membrane has a mass per unit area ranging from $0.2$ $g/m^2$ to 1 $g/m^2$. In some embodiments, the polymer membrane has a mass per unit area ranging from $0.4$ $g/m^2$ to 1 $g/m^2$.

In some embodiments, the polymer membrane has a mass per unit area ranging from $0.01$ $g/m^2$ to 5 $g/m^2$. In some embodiments, the polymer membrane has a mass per unit area ranging from $0.01$ $g/m^2$ to 2 $g/m^2$. In some embodiments, the polymer membrane has a mass per unit area ranging from $0.01$ $g/m^2$ to 1 $g/m^2$. In some embodiments, the polymer membrane has a mass per unit area ranging from $0.01$ $g/m^2$ to $0.5$ $g/m^2$. In some embodiments, the polymer membrane has a mass per unit area ranging from $0.01$ $g/m^2$ to $0.4$ $g/m^2$. In some embodiments, the polymer membrane has a mass per unit area ranging from $0.01$ $g/m^2$ to $0.2$ $g/m^2$. In some embodiments, the polymer membrane has a mass per unit area ranging from $0.01$ $g/m^2$ to $0.05$ $g/m^2$.

In some embodiments, the polymer membrane has a mass per unit area ranging from $0.05$ $g/m^2$ to $7.5$ $g/m^2$. In some embodiments, the polymer membrane has a mass per unit area ranging from $0.1$ $g/m^2$ to $7.5$ $g/m^2$. In some embodiments, the polymer membrane has a mass per unit area ranging from $0.2$ $g/m^2$ to $7.5$ $g/m^2$. In some embodiments, the polymer membrane has a mass per unit area ranging from $0.4$ $g/m^2$ to $7.5$ $g/m^2$. In some embodiments, the polymer membrane has a mass per unit area ranging from $0.5$ $g/m^2$ to $7.5$ $g/m^2$. In some embodiments, the polymer membrane has a mass per unit area ranging from 1 $g/m^2$ to $7.5$ $g/m^2$. In some embodiments, the polymer membrane has a mass per unit area ranging from 2 $g/m^2$ to $7.5$ $g/m^2$. In some embodiments, the polymer membrane has a mass per unit area ranging from 5 $g/m^2$ to $7.5$ $g/m^2$.

In some embodiments, the polymer membrane exhibits a Water Entry Pressure ("WEP") of $0.5$ psi to 450 psi. In some embodiments, the polymer membrane exhibits a WEP of $0.5$ psi to 200 psi. In some embodiments, the polymer membrane exhibits a WEP of 1 psi to 150 psi. In some embodiments, the polymer membrane exhibits a WEP of 1 psi to 100 psi. In some embodiments, the polymer membrane exhibits a WEP of 1 psi to 50 psi. In some embodiments, the polymer membrane exhibits a WEP of 25 psi to 150 psi. In some embodiments, the polymer membrane exhibits a WEP of 50 psi to 150 psi. In some embodiments, the polymer membrane exhibits a WEP of 1 psi to 110.8 psi.

In some embodiments, the polymer membrane exhibits a WEP of $1.4$ psi to 432 psi. In some embodiments, the polymer membrane exhibits a WEP of $0.95$ psi to 432 psi. In some embodiments, the polymer membrane exhibits a WEP of $0.95$ psi to 111 psi.

In some embodiments, the polymer membrane includes at least one of: polyolefins, polyurethanes, polyesters, polyamides, polyketones, polysulfones, or polycarbonates. In some embodiments, the polymer membrane can include a fluoropolymer. In some embodiments, the fluoropolymer includes one or more of polyvinylidene difluoride (PVDF), poly(tetrafluoroethylene-co-hexafluoropropylene) (FEP), poly (ethylene-alt-tetrafluoroethylene) (ETFE), polychlorotrifluoroethylene (PCTFE), poly(tetrafluoroethylene-co-perfluoropropyl vinyl ether) (PFA), poly (vinylidene fluoride-co-hexafluoropropylene) (PVDF-co-HFP), polyvinyl fluoride (PVF), or any combination thereof.

In some embodiments, the fluoropolymer is polytetrafluoroethylene (PTFE). In some embodiments, the PTFE is expanded polytetrafluoroethylene (ePTFE).

In some embodiments, the polymer membrane can have a homogeneous pore size distribution. A homogenous pore size distribution is where the pore size distribution remains the same as a function of thickness within the membrane. An inhomogeneous pore size distribution is where the pore size distribution changes as a function of thickness within the membrane. In some embodiments, the pore size distribution is homogeneous. In other embodiments, the pore size distribution is inhomogeneous.

In some embodiments, the first support member includes at least one aperture. In some embodiments, the at least one aperture has a diameter of 1 μm to 200 μm. In some embodiments, the at least one aperture has a diameter of 2 μm to 200 μm. In some embodiments, the at least one aperture has a diameter of 3 μm to 200 μm. In some embodiments, the at least one aperture has a diameter of 4 μm to 200 μm. In some embodiments, the at least one aperture has a diameter of 5 μm to 200 μm. In some embodiments, the at least one aperture has a diameter of 10 μm to 200 μm. In some embodiments, the at least one aperture has a diameter of 15 μm to 200 μm. In some embodiments, the at least one aperture has a diameter of 20 μm to 200 μm. In some embodiments, the at least one aperture has a diameter of 25 μm to 200 μm. In some embodiments, the at least one aperture has a diameter of 30 μm to 200 μm. In some embodiments, the at least one aperture has a diameter of 40 μm to 200 μm. In some embodiments, the at least one aperture has a diameter of 50 μm to 200 μm. In some embodiments, the at least one aperture has a diameter of 60 μm to 200 μm. In some embodiments, the at least one aperture has a diameter of 70 μm to 200 μm. In some embodiments, the at least one aperture has a diameter of 80 μm to 200 μm. In some embodiments, the at least one aperture has a diameter of 90 μm to 200 μm. In some embodiments, the at least one aperture has a diameter of 100 μm to 200 μm. In some embodiments, the at least one aperture has a diameter of 110 μm to 200 μm. In some embodiments, the at least one aperture has a diameter of 120 μm to 200 μm. In some embodiments, the at least one aperture has a diameter of 130 μm to 200 μm. In some embodiments, the at least one aperture has a diameter of 140 μm to 200 μm. In some embodiments, the at least one aperture has a diameter of 150 μm to 200 μm. In some embodiments, the at least one aperture has a diameter of 160 μm to 200 μm. In some embodiments, the at least one aperture has a diameter of 170 μm to 200 μm. In some embodiments, the at least one aperture has a diameter of 180 μm to 200 μm. In some embodiments, the at least one aperture has a diameter of 190 μm to 200 μm.

In some embodiments, the at least one aperture has a diameter of 1 μm to 190 μm. In some embodiments, the at least one aperture has a diameter of 1 μm to 180 μm. In some embodiments, the at least one aperture has a diameter of 1 μm to 170 μm. In some embodiments, the at least one aperture has a diameter of 1 μm to 160 μm. In some embodiments, the at least one aperture has a diameter of 1

μm to 150 μm. In some embodiments, the at least one aperture has a diameter of 1 μm to 140 μm. In some embodiments, the at least one aperture has a diameter of 1 μm to 130 μm. In some embodiments, the at least one aperture has a diameter of 1 μm to 120 μm. In some embodiments, the at least one aperture has a diameter of 1 μm to 110 μm. In some embodiments, the at least one aperture has a diameter of 1 μm to 100 μm. In some embodiments, the at least one aperture has a diameter of 1 μm to 90 μm. In some embodiments, the at least one aperture has a diameter of 1 μm to 80 μm. In some embodiments, the at least one aperture has a diameter of 1 μm to 70 μm. In some embodiments, the at least one aperture has a diameter of 1 μm to 60 μm. In some embodiments, the at least one aperture has a diameter of 1 μm to 50 μm. In some embodiments, the at least one aperture has a diameter of 1 μm to 40 μm. In some embodiments, the at least one aperture has a diameter of 1 μm to 30 μm. In some embodiments, the at least one aperture has a diameter of 1 μm to 25 μm. In some embodiments, the at least one aperture has a diameter of 1 μm to 20 μm. In some embodiments, the at least one aperture has a diameter of 1 μm to 15 μm. In some embodiments, the at least one aperture has a diameter of 1 μm to 10 μm. In some embodiments, the at least one aperture has a diameter of 1 μm to 5 μm. In some embodiments, the at least one aperture has a diameter of 1 μm to 4 μm. In some embodiments, the at least one aperture has a diameter of 1 μm to 3 μm. In some embodiments, the at least one aperture has a diameter of 1 μm to 2 μm.

In some embodiments, the at least one aperture has a diameter of 25 μm to 100 μm. In some embodiments, the at least one aperture has a diameter of 25 μm to 95 μm. In some embodiments, the at least one aperture has a diameter of 25 μm to 90 μm. In some embodiments, the at least one aperture has a diameter of 25 μm to 85 μm. In some embodiments, the at least one aperture has a diameter of 25 μm to 80 μm. In some embodiments, the at least one aperture has a diameter of 25 μm to 75 μm. In some embodiments, the at least one aperture has a diameter of 25 μm to 70 μm. In some embodiments, the at least one aperture has a diameter of 25 μm to 65 μm. In some embodiments, the at least one aperture has a diameter of 25 μm to 60 μm. In some embodiments, the at least one aperture has a diameter of 25 μm to 55 μm. In some embodiments, the at least one aperture has a diameter of 25 μm to 50 μm. In some embodiments, the at least one aperture has a diameter of 25 μm to 45 μm. In some embodiments, the at least one aperture has a diameter of 25 μm to 40 μm. In some embodiments, the at least one aperture has a diameter of 25 μm to 35 μm. In some embodiments, the at least one aperture has a diameter of 25 μm to 30 μm.

In some embodiments, the at least one aperture has a diameter of 30 μm to 100 μm. In some embodiments, the at least one aperture has a diameter of 35 μm to 100 μm. In some embodiments, the at least one aperture has a diameter of 40 μm to 100 μm. In some embodiments, the at least one aperture has a diameter of 45 μm to 100 μm. In some embodiments, the at least one aperture has a diameter of 50 μm to 100 μm. In some embodiments, the at least one aperture has a diameter of 55 μm to 100 μm. In some embodiments, the at least one aperture has a diameter of 60 μm to 100 μm. In some embodiments, the at least one aperture has a diameter of 65 μm to 100 μm. In some embodiments, the at least one aperture has a diameter of 70 μm to 100 μm. In some embodiments, the at least one aperture has a diameter of 75 μm to 100 μm. In some embodiments, the at least one aperture has a diameter of 80 μm to 100 μm. In some embodiments, the at least one aperture has a diameter of 85 μm to 100 μm. In some embodiments, the at least one aperture has a diameter of 90 μm to 100 μm. In some embodiments, the at least one aperture has a diameter of 95 μm to 100 μm.

In some embodiments, the first support member includes a plurality of apertures. In some embodiments, the plurality of apertures includes 5 to 100 apertures. In some embodiments, the first support member includes more than 100 apertures. For example, in some embodiments, the plurality of apertures can include 5 to 1,000 apertures. In some embodiments, the plurality of apertures can include 5 to 900 apertures. In some embodiments, the plurality of apertures can include 5 to 800 apertures. In some embodiments, the plurality of apertures can include 5 to 700 apertures. In some embodiments, the plurality of apertures can include 5 to 600 apertures. In some embodiments, the plurality of apertures can include 5 to 500 apertures. In some embodiments, the plurality of apertures can include 5 to 400 apertures. In some embodiments, the plurality of apertures can include 5 to 300 apertures. In some embodiments, the plurality of apertures can include 5 to 200 apertures.

In some embodiments, the plurality of apertures includes 10 to 100 apertures. In some embodiments, the plurality of apertures includes 15 to 100 apertures. In some embodiments, the plurality of apertures includes 20 to 100 apertures. In some embodiments, the plurality of apertures includes 25 to 100 apertures. In some embodiments, the plurality of apertures includes 30 to 100 apertures. In some embodiments, the plurality of apertures includes 40 to 100 apertures. In some embodiments, the plurality of apertures includes 50 to 100 apertures. In some embodiments, the plurality of apertures includes 60 to 100 apertures. In some embodiments, the plurality of apertures includes 70 to 100 apertures. In some embodiments, the plurality of apertures includes 80 to 100 apertures. In some embodiments, the plurality of apertures includes 90 to 100 apertures.

In some embodiments, the plurality of apertures includes 5 to 90 apertures. In some embodiments, the plurality of apertures includes 5 to 80 apertures. In some embodiments, the plurality of apertures includes 5 to 70 apertures. In some embodiments, the plurality of apertures includes 5 to 60 apertures. In some embodiments, the plurality of apertures includes 5 to 100 apertures. In some embodiments, the plurality of apertures includes 5 to 50 apertures. In some embodiments, the plurality of apertures includes 5 to 40 apertures. In some embodiments, the plurality of apertures includes 5 to 30 apertures. In some embodiments, the plurality of apertures includes 5 to 25 apertures. In some embodiments, the plurality of apertures includes 5 to 20 apertures. In some embodiments, the plurality of apertures includes 5 to 15 apertures. In some embodiments, the plurality of apertures includes 5 to 10 apertures.

In some embodiments, the apertures are disposed within an area bounding the apertures that is circular in shape. In some embodiments, a diameter of the circle bounding the apertures was selected to be 1 to 2 mm in diameter. In some embodiments, a diameter of the circle bounding the apertures was selected to be 1.1 to 2 mm in diameter. In some embodiments, a diameter of the circle bounding the apertures was selected to be 1.2 to 2 mm in diameter. In some embodiments, a diameter of the circle bounding the apertures was selected to be 1.3 to 2 mm in diameter. In some embodiments, a diameter of the circle bounding the apertures was selected to be 1.4 to 2 mm in diameter. In some embodiments, a diameter of the circle bounding the apertures was selected to be 1.5 to 2 mm in diameter. In some embodiments, a diameter of the circle bounding the apertures was selected to be 1.6 to 2 mm in diameter. In some embodiments, a diameter of the circle bounding the apertures was selected to be 1.7 to 2 mm in diameter. In some embodiments, a diameter of the circle bounding the apertures was selected to be 1.8 to 2 mm in diameter. In some embodiments, a diameter of the circle bounding the apertures was selected to be 1.9 to 2 mm in diameter.

In some embodiments, a diameter of the circle bounding the apertures was selected to be 1 to 1.9 mm in diameter. In some embodiments, a diameter of the circle bounding the apertures was selected to be 1 to 1.8 mm in diameter. In some embodiments, a diameter of the circle bounding the apertures was selected to be 1 to 1.7 mm in diameter. In some embodiments, a diameter of the circle bounding the apertures was selected to be 1 to 1.6 mm in diameter. In some embodiments, a diameter of the circle bounding the apertures was selected to be 1 to 1.5 mm in diameter. In some embodiments, a diameter of the circle bounding the apertures was selected to be 1 to 1.4 mm in diameter. In some embodiments, a diameter of the circle bounding the apertures was selected to be 1 to 1.3 mm in diameter. In some embodiments, a diameter of the circle bounding the apertures was selected to be 1 to 1.2 mm in diameter. In some embodiments, a diameter of the circle bounding the apertures was selected to be 1 to 1.1 mm in diameter.

In some embodiments, the first support member includes at least one metal. In some embodiments, the first support member includes at least one polymer. In some embodiments, the first support member includes fiberglass. In some embodiments, the first support member includes one or more metals, one or more polymers, or fiberglass.

In some embodiments, the at least one metal includes one or more of zinc, nickel, chromium, vanadium, molybdenum, manganese, copper, iron, aluminum, titanium, combinations and alloys thereof. In some embodiments, the metal includes an alloy such as carbon steel, stainless steel, bronze, brass, combinations thereof, or composite alloys thereof.

In some embodiments, the at least one polymer is in the form of a woven or nonwoven material. In some embodiments, the at least one polymer includes one or more of: extruded plastic, polyethylene terephthalate (PET), polyphenylene sulfide (PPS), polybutylene terephthalate (PBT), polyether ether ketone (PEEK); polypthalamides (PPA), acetal homopolymers; polyethylene terephthalate (PET), one or more thermoset epoxies, or one or more thermoset elastomers. In some embodiments, the first support member can include multiple components with different melting temperatures.

In some embodiments, the first support member can be a mesh or woven material having a selected acoustic resistance value to achieve a selected total effective acoustic resistance. In some embodiments, the mesh can be a woven polyethylene terephthalate (PET) mesh. In some embodiments, the mesh can be an extruded plastic non-woven mesh.

In some embodiments, the first support member is spaced from the polymer membrane by a first distance. In some embodiments, the first distance is 10 μm to 100 μm. In some embodiments, the first distance is 20 μm to 100 μm. In some embodiments, the first distance is 30 μm to 100 μm. In some embodiments, the first distance is 40 μm to 100 μm. In some embodiments, the first distance is 50 μm to 100 μm. In some embodiments, the first distance is 60 μm to 100 μm. In some embodiments, the first distance is 70 μm to 100 μm. In some embodiments, the first distance is 80 μm to 100 μm. In some embodiments, the first distance is 90 μm to 100 μm.

In some embodiments, the first distance is 10 μm to 90 μm. In some embodiments, the first distance is 10 μm to 80 μm. In some embodiments, the first distance is 10 μm to 70 μm. In some embodiments, the first distance is 10 μm to 60 μm. In some embodiments, the first distance is 10 μm to 50 μm. In some embodiments, the first distance is 10 μm to 40 μm. In some embodiments, the first distance is 10 μm to 30 μm. In some embodiments, the first distance is 50 μm to 60 μm. In some embodiments, the first distance is 10 μm to 20 μm.

In some embodiments, an adhesive secures the polymer adhesive to the first support member. In some embodiments, the first distance is defined by a thickness of the adhesive. In some embodiments, the adhesive includes one or more high melt thermoplastics. In one embodiment, the high melt thermoplastic material may include poly(ethylene-co-tetrafluoroethylene-co-hexafluoropropylene (EFEP), tetrafluoroethylene hexafluoropropylene vinylidene fluoride (THV), poly(tetrafluoroethylene-co-hexafluoropropylene) (FEP), perfluoroalkoxy (PFA), Ethylene tetrafluoroethylene (ETFE), PVC resins, nitrile rubber, or combinations thereof.

In some embodiments, the first support member has a thickness of from 100 μm to 300 μm. In some embodiments, the first support member has a thickness of from 110 μm to 300 μm. In some embodiments, the first support member has a thickness of from 120 μm to 300 μm. In some embodiments, the first support member has a thickness of from 130 μm to 300 μm. In some embodiments, the first support member has a thickness of from 140 μm to 300 μm. In some embodiments, the first support member has a thickness of from 150 μm to 300 μm. In some embodiments, the first support member has a thickness of from 200 μm to 300 μm. In some embodiments, the first support member has a thickness of from 250 μm to 300 μm.

In some embodiments, the first support member has a thickness of from 100 μm to 250 μm. In some embodiments, the first support member has a thickness of from 100 μm to 200 μm. In some embodiments, the first support member has a thickness of from 100 μm to 150 μm. In some embodiments, the first support member has a thickness of from 100 μm to 140 μm. In some embodiments, the first support member has a thickness of from 100 μm to 130 μm. In some embodiments, the first support member has a thickness of from 100 μm to 120 μm. In some embodiments, the first support member has a thickness of from 100 μm to 110 μm.

In some embodiments, the first support member is a rigid body that does not deform under 3 bar of water pressure.

In some embodiments, the "% open area" of the first support member is the portion of the first support member that is not solid. In some embodiments, the % open area ranges from 1% to 99%. In some embodiments, the % open area ranges from 2% to 99%. In some embodiments, the % open area ranges from 3% to 99%. In some embodiments, the % open area ranges from 5% to 99%. In some embodiments, the % open area ranges from 10% to 99%. In some embodiments, the % open area ranges from 15% to 99%. In some embodiments, the % open area ranges from 20% to 99%. In some embodiments, the % open area ranges from 25% to 99%. In some embodiments, the % open area ranges from 30% to 99%. In some embodiments, the % open area ranges from 35% to 99%. In some embodiments, the % open area ranges from 40% to 99%. In some embodiments, the % open area ranges from 45% to 99%. In some embodiments, the % open area ranges from 50% to 99%. In some embodiments, the % open area ranges from 60% to 99%. In some embodiments, the % open area ranges from 70% to 99%. In some embodiments, the % open area ranges from 80% to 99%. In some embodiments, the % open area ranges from 90% to 99%. In some embodiments, the % open area ranges from 95% to 99%.

In some embodiments, the % open area ranges from 1% to 95%. In some embodiments, the % open area ranges from 1% to 90%. In some embodiments, the % open area ranges from 1% to 80%. In some embodiments, the % open area ranges from 1% to 70%. In some embodiments, the % open area ranges from 1% to 60%. In some embodiments, the % open area ranges from 10% to 50%. In some embodiments, the % open area ranges from 10% to 45%. In some embodiments, the % open area ranges from 1% to 40%. In some embodiments, the % open area ranges from 1% to 35%. In some embodiments, the % open area ranges from 1% to 30%. In some embodiments, the % open area ranges from 1% to 25%. In some embodiments, the % open area ranges from 1% to 20%. In some embodiments, the % open area ranges from 1% to 15%. In some embodiments, the % open area ranges from 1% to 10%. In some embodiments, the % open area ranges from 1% to 5%. In some embodiments, the % open area ranges from 1% to 3%. In some embodiments, the % open area ranges from 1% to 2%.

In some embodiments, the second support member includes at least one aperture. In some embodiments, the at least one aperture has a diameter of 1 μm to 200 μm. In some embodiments, the at least one aperture has a diameter of 2 μm to 200 μm. In some embodiments, the at least one aperture has a diameter of 3 μm to 200 μm. In some embodiments, the at least one aperture has a diameter of 4 μm to 200 μm. In some embodiments, the at least one aperture has a diameter of 5 μm to 200 μm. In some embodiments, the at least one aperture has a diameter of 10 μm to 200 μm. In some embodiments, the at least one aperture has a diameter of 15 μm to 200 μm. In some embodiments, the at least one aperture has a diameter of 20 μm to 200 μm. In some embodiments, the at least one aperture has a diameter of 25 μm to 200 μm. In some embodiments, the at least one aperture has a diameter of 30 μm to 200 μm. In some embodiments, the at least one aperture has a diameter of 40 μm to 200 μm. In some embodiments, the at least one aperture has a diameter of 50 μm to 200 μm. In some embodiments, the at least one aperture has a diameter of 60 μm to 200 μm. In some embodiments, the at least one aperture has a diameter of 70 μm to 200 μm. In some embodiments, the at least one aperture has a diameter of 80 μm to 200 μm. In some embodiments, the at least one aperture has a diameter of 90 μm to 200 μm. In some embodiments, the at least one aperture has a diameter of 100 μm to 200 μm. In some embodiments, the at least one aperture has a diameter of 110 μm to 200 μm. In some embodiments, the at least one aperture has a diameter of 120 μm to 200 μm. In some embodiments, the at least one aperture has a diameter of 130 μm to 200 μm. In some embodiments, the at least one aperture has a diameter of 140 μm to 200 μm. In some embodiments, the at least one aperture has a diameter of 150 μm to 200 μm. In some embodiments, the at least one aperture has a diameter of 160 μm to 200 μm. In some embodiments, the at least one aperture has a diameter of 170 μm to 200 μm. In some embodiments, the at least one aperture has a diameter of 180 μm to 200 μm. In some embodiments, the at least one aperture has a diameter of 190 μm to 200 μm.

In some embodiments, the at least one aperture has a diameter of 1 μm to 190 μm. In some embodiments, the at least one aperture has a diameter of 1 μm to 180 μm. In some embodiments, the at least one aperture has a diameter of 1 μm to 170 μm. In some embodiments, the at least one aperture has a diameter of 1 μm to 160 μm. In some embodiments, the at least one aperture has a diameter of 1 μm to 150 μm. In some embodiments, the at least one aperture has a diameter of 1 μm to 140 μm. In some embodiments, the at least one aperture has a diameter of 1 μm to 130 μm. In some embodiments, the at least one aperture has a diameter of 1 μm to 120 μm. In some embodiments, the at least one aperture has a diameter of 1 μm to 110 μm. In some embodiments, the at least one aperture has a diameter of 1 μm to 100 μm. In some embodiments, the at least one aperture has a diameter of 1 μm to 90 μm. In some embodiments, the at least one aperture has a diameter of 1 μm to 80 μm. In some embodiments, the at least one aperture has a diameter of 1 μm to 70 μm. In some embodiments, the at least one aperture has a diameter of 1 μm to 60 μm. In some embodiments, the at least one aperture has a diameter of 1 μm to 50 μm. In some embodiments, the at least one aperture has a diameter of 1 μm to 40 μm. In some embodiments, the at least one aperture has a diameter of 1 μm to 30 μm. In some embodiments, the at least one aperture has a diameter of 1 μm to 25 μm. In some embodiments, the at least one aperture has a diameter of 1 μm to 20 μm. In some embodiments, the at least one aperture has a diameter of 1 μm to 15 μm. In some embodiments, the at least one aperture has a diameter of 1 μm to 10 μm. In some embodiments, the at least one aperture has a diameter of 1 μm to 5 μm. In some embodiments, the at least one aperture has a diameter of 1 μm to 4 μm. In some embodiments, the at least one aperture has a diameter of 1 μm to 3 μm. In some embodiments, the at least one aperture has a diameter of 1 μm to 2 μm.

In some embodiments, the at least one aperture has a diameter of 50 μm to 60 μm. In some embodiments, the at least one aperture has a diameter of 51 μm to 60 μm. In some embodiments, the at least one aperture has a diameter of 52 μm to 60 μm. In some embodiments, the at least one aperture has a diameter of 53 μm to 60 μm. In some embodiments, the at least one aperture has a diameter of 54 μm to 60 μm. In some embodiments, the at least one aperture has a diameter of 55 μm to 60 μm. In some embodiments, the at least one aperture has a diameter of 56 μm to 60 μm. In some embodiments, the at least one aperture has a diameter of 57 μm to 60 μm. In some embodiments, the at least one aperture has a diameter of 58 μm to 60 μm. In some embodiments, the at least one aperture has a diameter of 59 μm to 60 μm.

In some embodiments, the at least one aperture has a diameter of 50 μm to 59 μm. In some embodiments, the at least one aperture has a diameter of 50 μm to 58 μm. In some embodiments, the at least one aperture has a diameter of 50 μm to 57 μm. In some embodiments, the at least one aperture has a diameter of 50 μm to 56 μm. In some embodiments, the at least one aperture has a diameter of 50 μm to 55 μm. In some embodiments, the at least one aperture has a diameter of 50 μm to 54 μm. In some embodiments, the at least one aperture has a diameter of 50 μm to 53 μm. In some embodiments, the at least one aperture has a diameter of 50 μm to 52 μm. In some embodiments, the at least one aperture has a diameter of 50 μm to 51 μm.

In some embodiments, the at least one aperture has a diameter of 54 μm to 56 μm. In some embodiments, the at least one aperture has a diameter of 53 μm to 57 μm. In some embodiments, the at least one aperture has a diameter of 52 μm to 58 μm. In some embodiments, the at least one aperture has a diameter of 51 μm to 59 μm.

In some embodiments, the second support member includes a plurality of apertures. In some embodiments, the plurality of apertures includes 5 to 100 apertures. In some embodiments, the second support member includes more than 100 apertures. For example, in some embodiments, the plurality of apertures can include 5 to 1,000 apertures. In some embodiments, the plurality of apertures can include 5 to 900 apertures. In some embodiments, the plurality of apertures can include 5 to 800 apertures. In some embodiments, the plurality of apertures can include 5 to 700 apertures. In some embodiments, the plurality of apertures can include 5 to 600 apertures. In some embodiments, the plurality of apertures can include 5 to 500 apertures. In some embodiments, the plurality of apertures can include 5 to 400 apertures. In some embodiments, the plurality of apertures can include 5 to 300 apertures. In some embodiments, the plurality of apertures can include 5 to 200 apertures.

In some embodiments, the plurality of apertures includes 10 to 100 apertures. In some embodiments, the plurality of apertures includes 15 to 100 apertures. In some embodiments, the plurality of apertures includes 20 to 100 apertures. In some embodiments, the plurality of apertures includes 25 to 100 apertures. In some embodiments, the plurality of apertures includes 30 to 100 apertures. In some embodiments, the plurality of apertures includes 40 to 100 apertures. In some embodiments, the plurality of apertures includes 50 to 100 apertures. In some embodiments, the plurality of apertures includes 60 to 100 apertures. In some embodiments, the plurality of apertures includes 70 to 100 apertures. In some embodiments, the plurality of apertures includes 80 to 100 apertures. In some embodiments, the plurality of apertures includes 90 to 100 apertures.

In some embodiments, the plurality of apertures includes 5 to 90 apertures. In some embodiments, the plurality of apertures includes 5 to 80 apertures. In some embodiments, the plurality of apertures includes 5 to 70 apertures. In some embodiments, the plurality of apertures includes 5 to 60 apertures. In some embodiments, the plurality of apertures includes 5 to 100 apertures. In some embodiments, the plurality of apertures includes 5 to 50 apertures. In some embodiments, the plurality of apertures includes 5 to 40 apertures. In some embodiments, the plurality of apertures includes 5 to 30 apertures. In some embodiments, the plurality of apertures includes 5 to 25 apertures. In some embodiments, the plurality of apertures includes 5 to 20 apertures. In some embodiments, the plurality of apertures includes 5 to 15 apertures. In some embodiments, the plurality of apertures includes 5 to 10 apertures.

In some embodiments, the apertures are disposed within an area bounding the apertures that is circular in shape. In some embodiments, a diameter of the circle bounding the apertures was selected to be 1 to 2 mm in diameter. In some embodiments, a diameter of the circle bounding the apertures was selected to be 1.1 to 2 mm in diameter. In some embodiments, a diameter of the circle bounding the apertures was selected to be 1.2 to 2 mm in diameter. In some embodiments, a diameter of the circle bounding the apertures was selected to be 1.3 to 2 mm in diameter. In some embodiments, a diameter of the circle bounding the apertures was selected to be 1.4 to 2 mm in diameter. In some embodiments, a diameter of the circle bounding the apertures was selected to be 1.5 to 2 mm in diameter. In some embodiments, a diameter of the circle bounding the apertures was selected to be 1.6 to 2 mm in diameter. In some embodiments, a diameter of the circle bounding the apertures was selected to be 1.7 to 2 mm in diameter. In some embodiments, a diameter of the circle bounding the apertures was selected to be 1.8 to 2 mm in diameter. In some embodiments, a diameter of the circle bounding the apertures was selected to be 1.9 to 2 mm in diameter.

In some embodiments, a diameter of the circle bounding the apertures was selected to be 1 to 1.9 mm in diameter. In some embodiments, a diameter of the circle bounding the apertures was selected to be 1 to 1.8 mm in diameter. In some embodiments, a diameter of the circle bounding the apertures was selected to be 1 to 1.7 mm in diameter. In some embodiments, a diameter of the circle bounding the apertures was selected to be 1 to 1.6 mm in diameter. In some embodiments, a diameter of the circle bounding the apertures was selected to be 1 to 1.5 mm in diameter. In some embodiments, a diameter of the circle bounding the apertures was selected to be 1 to 1.4 mm in diameter. In some embodiments, a diameter of the circle bounding the apertures was selected to be 1 to 1.3 mm in diameter. In some embodiments, a diameter of the circle bounding the apertures was selected to be 1 to 1.2 mm in diameter. In some embodiments, a diameter of the circle bounding the apertures was selected to be 1 to 1.1 mm in diameter.

In some embodiments, the second support member includes at least one metal. In some embodiments, the second support member includes at least one polymer. In some embodiments, the second support member includes fiberglass. In some embodiments, the second support member includes one or more metals, one or more polymers, or fiberglass.

In some embodiments, the at least one metal includes one or more of zinc, nickel, chromium, vanadium, molybdenum, manganese, copper, iron, aluminum, titanium, combinations and alloys thereof. In some embodiments, the metal includes an alloy such as carbon steel, stainless steel, bronze, brass, combinations thereof, or composite alloys thereof.

In some embodiments, the at least one polymer is in the form of a woven or nonwoven material. In some embodiments, the at least one polymer includes one or more of: extruded plastic, polyethylene terephthalate (PET), polyphenylene sulfide (PPS), polybutylene terephthalate (PBT), polyether ether ketone (PEEK); polypthalamides (PPA), acetal homopolymers; polyethylene terephthalate (PET), one or more thermoset epoxies, or one or more thermoset elastomers. In some embodiments, the second support member can include multiple components with different melting temperatures.

In some embodiments, the second support member can be a mesh or woven material having a selected acoustic resistance value to achieve a selected total effective acoustic resistance. In some embodiments, the mesh can be a woven polyethylene terephthalate (PET) mesh. In some embodiments, the mesh can be an extruded plastic non-woven mesh.

In some embodiments, the second support member is spaced from the polymer membrane by a second distance. In some embodiments, the second distance is 10 µm to 100 µm. In some embodiments, the second distance is 20 µm to 100 µm. In some embodiments, the second distance is 30 µm to 100 µm. In some embodiments, the second distance is 40 µm to 100 µm. In some embodiments, the second distance is 50 µm to 100 µm. In some embodiments, the second distance is 60 µm to 100 µm. In some embodiments, the second distance is 70 µm to 100 µm. In some embodiments, the second distance is 80 µm to 100 µm. In some embodiments, the second distance is 90 µm to 100 µm.

In some embodiments, the second distance is 10 µm to 90 µm. In some embodiments, the second distance is 10 µm to 80 µm. In some embodiments, the second distance is 10 µm to 70 µm. In some embodiments, the second distance is 10

µm to 60 µm. In some embodiments, the second distance is 10 µm to 50 µm. In some embodiments, the second distance is 10 µm to 40 µm. In some embodiments, the second distance is 10 µm to 30 µm. In some embodiments, the second distance is 50 µm to 60 µm. In some embodiments, the second distance is 10 µm to 20 µm.

In some embodiments, an adhesive secures the polymer adhesive to the second support member. In some embodiments, the second distance is defined by a thickness of the adhesive. In some embodiments, the adhesive includes one or more high melt thermoplastics. In one embodiment, the high melt thermoplastic material may include poly(ethylene-co-tetrafluoroethylene-co-hexafluoropropylene(EFEP), tetrafluoroethylene hexafluoropropylene vinylidene fluoride (THV), poly(tetrafluoroethylene-co-hexafluoropropylene) (FEP), perfluoroalkoxy (PFA), Ethylene tetrafluoroethylene (ETFE), PVC resins, nitrile rubber, or combinations thereof.

In some embodiments, the second support member has a thickness of from 100 µm to 300 µm. In some embodiments, the second support member has a thickness of from 110 µm to 300 µm. In some embodiments, the second support member has a thickness of from 120 µm to 300 µm. In some embodiments, the second support member has a thickness of from 130 µm to 300 µm. In some embodiments, the second support member has a thickness of from 140 µm to 300 µm. In some embodiments, the second support member has a thickness of from 150 µm to 300 µm. In some embodiments, the second support member has a thickness of from 200 µm to 300 µm. In some embodiments, the second support member has a thickness of from 250 µm to 300 µm.

In some embodiments, the second support member has a thickness of from 100 µm to 250 µm. In some embodiments, the second support member has a thickness of from 100 µm to 200 µm. In some embodiments, the second support member has a thickness of from 100 µm to 150 µm. In some embodiments, the second support member has a thickness of from 100 µm to 140 µm. In some embodiments, the second support member has a thickness of from 100 µm to 130 µm. In some embodiments, the second support member has a thickness of from 100 µm to 120 µm. In some embodiments, the second support member has a thickness of from 100 µm to 110 µm.

In some embodiments, the second support member is a rigid body that does not deform under 3 bar of water pressure.

In some embodiments, the "% open area" of the second support member is the portion of the second support member that is not solid. In some embodiments, the % open area ranges from 1% to 99%. In some embodiments, the % open area ranges from 2% to 99%. In some embodiments, the % open area ranges from 3% to 99%. In some embodiments, the % open area ranges from 5% to 99%. In some embodiments, the % open area ranges from 10% to 99%. In some embodiments, the % open area ranges from 15% to 99%. In some embodiments, the % open area ranges from 20% to 99%. In some embodiments, the % open area ranges from 25% to 99%. In some embodiments, the % open area ranges from 30% to 99%. In some embodiments, the % open area ranges from 35% to 99%. In some embodiments, the % open area ranges from 40% to 99%. In some embodiments, the % open area ranges from 45% to 99%. In some embodiments, the % open area ranges from 50% to 99%. In some embodiments, the % open area ranges from 60% to 99%. In some embodiments, the % open area ranges from 70% to 99%. In some embodiments, the % open area ranges from 80% to 99%. In some embodiments, the % open area ranges from 90% to 99%. In some embodiments, the % open area ranges from 95% to 99%.

In some embodiments, the % open area ranges from 1% to 95%. In some embodiments, the % open area ranges from 1% to 90%. In some embodiments, the % open area ranges from 1% to 80%. In some embodiments, the % open area ranges from 1% to 70%. In some embodiments, the % open area ranges from 1% to 60%. In some embodiments, the % open area ranges from 1% to 50%. In some embodiments, the % open area ranges from 1% to 45%. In some embodiments, the % open area ranges from 1% to 40%. In some embodiments, the % open area ranges from 1% to 35%. In some embodiments, the % open area ranges from 1% to 30%. In some embodiments, the % open area ranges from 1% to 25%. In some embodiments, the % open area ranges from 1% to 20%. In some embodiments, the % open area ranges from 1% to 15%. In some embodiments, the % open area ranges from 1% to 10%. In some embodiments, the % open area ranges from 1% to 5%. In some embodiments, the % open area ranges from 1% to 3%. In some embodiments, the % open area ranges from 1% to 2%.

In some embodiments, the first support member and the second support member are different materials. In some embodiments, the first support member is a first metal and the second support member is a second metal. In some embodiments, the first support member is a metal and the second support member is a polymer or fiberglass. In some embodiments the first support member is a first polymer and the second support member is a second polymer. In some embodiments, the first support member and the second support member are both fiberglass. In some embodiments, a material for the first support member and a material for the second support member are selected to collectively limit deformation of the polymer membrane.

In some embodiments, the first support member and the second support member include a different number of apertures. In some embodiments, the first support member andthe second support member include a different number of apertures and a diameter of the apertures of the first support member is the same as a diameter of the apertures of the second support member.

In some embodiments, the first support member and the second support member include the same number of apertures. In some embodiments, the first support member and the second support member include the same number of apertures and a diameter of the apertures of the first support member is different from a diameter of the apertures of the second support member.

In some embodiments, the assembly is configured to provide a standard deviation of insertion loss of less than 0.8 dB over a frequency range of 200 Hz to 10,000 Hz after a WEP test. In some embodiments, the assembly is configured to provide a standard deviation of insertion loss of 0.05 to 0.8 dB over a frequency range of 200 Hz to 10,000 Hz after a WEP test. In some embodiments, the assembly is configured to provide a standard deviation of insertion loss of 0.1 to 0.8 dB over a frequency range of 200 Hz to 10,000 Hz after a WEP test. In some embodiments, the assembly is configured to provide a standard deviation of insertion loss of 0.15 to 0.8 dB over a frequency range of 200 Hz to 10,000 Hz after a WEP test. In some embodiments, the assembly is configured to provide a standard deviation of insertion loss of 0.2 to 0.8 dB over a frequency range of 200 Hz to 10,000 Hz after a WEP test. In some embodiments, the assembly is configured to provide a standard deviation of insertion loss of 0.25 to 0.8 dB over a frequency range of 200 Hz to 10,000

Hz after a WEP test. In some embodiments, the assembly is configured to provide a standard deviation of insertion loss of 0.3 to 0.8 dB over a frequency range of 200 Hz to 10,000 Hz after a WEP test. In some embodiments, the assembly is configured to provide a standard deviation of insertion loss of 0.35 to 0.8 dB over a frequency range of 200 Hz to 10,000 Hz after a WEP test. In some embodiments, the assembly is configured to provide a standard deviation of insertion loss of 0.4 to 0.8 dB over a frequency range of 200 Hz to 10,000 Hz after a WEP test. In some embodiments, the assembly is configured to provide a standard deviation of insertion loss of 0.45 to 0.8 dB over a frequency range of 200 Hz to 10,000 Hz after a WEP test. In some embodiments, the assembly is configured to provide a standard deviation of insertion loss of 0.5 to 0.8 dB over a frequency range of 200 Hz to 10,000 Hz after a WEP test. In some embodiments, the assembly is configured to provide a standard deviation of insertion loss of 0.55 to 0.8 dB over a frequency range of 200 Hz to 10,000 Hz after a WEP test. In some embodiments, the assembly is configured to provide a standard deviation of insertion loss of 0.6 to 0.8 dB over a frequency range of 200 Hz to 10,000 Hz after a WEP test. In some embodiments, the assembly is configured to provide a standard deviation of insertion loss of 0.65 to 0.8 dB over a frequency range of 200 Hz to 10,000 Hz after a WEP test. In some embodiments, the assembly is configured to provide a standard deviation of insertion loss of 0.7 to 0.8 dB over a frequency range of 200 Hz to 10,000 Hz after a WEP test. In some embodiments, the assembly is configured to provide a standard deviation of insertion loss of 0.75 to 0.8 dB over a frequency range of 200 Hz to 10,000 Hz after a WEP test.

In some embodiments, the assembly is configured to provide a standard deviation of insertion loss of 0.05 to 0.75 dB over a frequency range of 200 Hz to 10,000 Hz after a WEP test. In some embodiments, the assembly is configured to provide a standard deviation of insertion loss of 0.05 to 0.7 dB over a frequency range of 200 Hz to 10,000 Hz after a WEP test. In some embodiments, the assembly is configured to provide a standard deviation of insertion loss of 0.05 to 0.65 dB over a frequency range of 200 Hz to 10,000 Hz after a WEP test. In some embodiments, the assembly is configured to provide a standard deviation of insertion loss of 0.05 to 0.6 dB over a frequency range of 200 Hz to 10,000 Hz after a WEP test. In some embodiments, the assembly is configured to provide a standard deviation of insertion loss of 0.05 to 0.55 dB over a frequency range of 200 Hz to 10,000 Hz after a WEP test. In some embodiments, the assembly is configured to provide a standard deviation of insertion loss of 0.05 to 0.5 dB over a frequency range of 200 Hz to 10,000 Hz after a WEP test. In some embodiments, the assembly is configured to provide a standard deviation of insertion loss of 0.05 to 0.45 dB over a frequency range of 200 Hz to 10,000 Hz after a WEP test. In some embodiments, the assembly is configured to provide a standard deviation of insertion loss of 0.05 to 0.4 dB over a frequency range of 200 Hz to 10,000 Hz after a WEP test. In some embodiments, the assembly is configured to provide a standard deviation of insertion loss of 0.05 to 0.35 dB over a frequency range of 200 Hz to 10,000 Hz after a WEP test. In some embodiments, the assembly is configured to provide a standard deviation of insertion loss of 0.05 to 0.3 dB over a frequency range of 200 Hz to 10,000 Hz after a WEP test. In some embodiments, the assembly is configured to provide a standard deviation of insertion loss of 0.05 to 0.25 dB over a frequency range of 200 Hz to 10,000 Hz after a WEP test. In some embodiments, the assembly is configured to provide a standard deviation of insertion loss of 0.05 to 0.2 dB over a frequency range of 200 Hz to 10,000 Hz after a WEP test. In some embodiments, the assembly is configured to provide a standard deviation of insertion loss of 0.05 to 0.15 dB over a frequency range of 200 Hz to 10,000 Hz after a WEP test. In some embodiments, the assembly is configured to provide a standard deviation of insertion loss of 0.05 to 0.1 dB over a frequency range of 200 Hz to 10,000 Hz after a WEP test.

Some embodiments of the present disclosure are directed to an acoustic device including a predominantly reactive supported acoustic membrane that includes a polymer membrane, a first support member on a first side of the polymer membrane, and a second support member on a second side of the polymer membrane.

In some embodiments, the acoustic device includes a speaker, a receiver, or any combination thereof.

Test Procedures

The following test procedures were used to generate the data in the "Non-Limiting Examples" section. The test procedures herein are not intended to be limiting.

Calculating % Open Area: The % Open Area can be calculated using the following equation:

$$\text{\% Open Area} = \text{Number of apertures} * \text{Area of each aperture} / (\text{total area bounding apertures})$$

"Young's Modulus": Herein, Young's Moduli of the polymer membranes were measured in accordance with ISO 527-1:2012.

"Bubble Point": Herein, bubble point was measured using the ASTM F316. 9599-1 method.

"Mass per unit area": Herein, mass per unit area was measured in accordance with ASTM D3776/D3776M-09a.

"Water Entry Pressure Testing (Capillary Piston Test ("CPT"))": As used herein, a "Water Entry Pressure (WEP) test" includes measuring, using a capillary flow porometer, model number CFP-1500-AE, purchased commercially from Porous Materials Inc., "Water Entry Pressure." The tested sample was clamped by two polycarbonate plates in the lower piston in the tester. The top plate has a central hole of 8 mm and an O-ring surrounding the hole for waterproofing. The bottom plate has a central hole of 1.5 mm.

The samples were prepared as described in each example, and the sample will be clamped by the top and bottom polycarbonateplates. For other sample assemblies, the material, or layers of different materials were cut into pieces large enough to cover the whole O-ring on the top polycarbonate plate and clamped by the top and bottom polycarbonate plates. Before the test, deionized water was added to fill the 8 mm hole in the top plate. The compression pressure was set to be 43.5 psi (3 bar) in the test program. The ramp rate of the pressure was 0.16 psi per second. The tester automatically and instantaneously detects the pressure (WEP) when water enters into the sample.

"Insertion Loss": Acoustic response was measured using a micro-electro-mechanical systems (MEMS) microphone fixture placed inside an anechoic box, commercially available from Bruel & Kjaer. The fixture was designed to accept the sample coupon which holds the membrane assembly with support members. SoundCheck® v15.0 software and AmpConnect™ hardware, commercially available from Listen Inc., were used to record the output response curve. An SCM-3 reference microphone, commercially available from Listen, Inc., and a calibrator, commercially available from Bruel & Kjaer, were used for a calibration sequence prior to measuring the sample. The open condition was first measured without the sample from 100 Hz to 10,000 Hz. The sample condition was then measured from 100 Hz to 10,000

Hz. Insertion loss was calculated as the difference between the open condition and the sample condition, in units of dB.

Insertion loss was measured before and after a WEP test. After the WEP test for 10 minutes, the samples were dried for 24 hours before testing again for insertion loss.

FIG. 1 depicts an assembly 10, according to some embodiments. As illustrated, assembly 10 includes a first support member 15 and a second support member 20. A polymer membrane 25 is disposed between the first support member 15 and the second support member 20. The polymer membrane 25 is spaced from the first support member 15 by a first distance 30. The polymer membrane 25 is spaced from the second support member 20 by a second distance 35. The first distance 30 can be defined by a thickness of an adhesive 40 disposed between the polymer membrane 25 and the first support member 15. The second distance 35 can be defined by a thickness of an adhesive 45 disposed between the polymer membrane 25 and the second support member 20. In some embodiments, the first distance 30 and the second distance 35 can allow the polymer membrane 25 sufficient space to vibrate and maintain a predominantly reactive mode of sound transmission. In some embodiments, the first distance 30 and the second distance 35 can also limit total distance which the polymer membrane 25 can deform prior to contacting either the first support member 15 or the second support member 20 during an immersion. In some embodiments, the first distance 30 and the second distance 35 can be the same. In some embodiments, the first distance 30 and the second distance 35 can be different.

In some embodiments, the first support member 15 can be disposed on a water entry side of the assembly 10. In some embodiments, the first support member 15 can prevent the polymer membrane 25 from deforming towards a direction of the water entry after an immersion event. In some embodiments, the first support member 15 can reduce an acoustic variability of the assembly 10 after a water immersion event.

In some embodiments, the second support member 20 can be disposed on an opposite side of the polymer membrane 25 from the water entry side. In some embodiments, the second support member 20 can prevent the polymer membrane 25 from permanent deformation away from the direction of the water entry during an immersion event.

In some embodiments, the first support member 15 can include a plurality of apertures 50 and the second support member 20 can include a plurality of apertures 55. A size and number of the apertures 50 and the apertures 55 can be controlled to modify a total effective acoustic resistance of the assembly 10. In some embodiments, the size and number of the apertures 50 and the apertures 55 can be controlled to achieve a flat curve shape and reduce insertion loss over a desired frequency range such as from 200 Hz to 10,000 Hz.

NON-LIMITING EXAMPLES

Assemblies were tested including a first support member (one of Plates A to D), a polymer membrane, and a second support member (Plate E). The polymer membrane is commercially available under the trade name GAW334, commercially available from W.L. Gore & Associates, Inc. The polymer membrane was an ePTFE membrane having a thickness of 7.4 μm, a porosity of 0.697, a Young's modulus of 86.7 MPa [0-5%], a mass per area of 4.9 g/m², a flow resistance of 109,133 Rayls, and a bubble point of 52 psi. Different hole configurations were tested for the first support member. The second support member was held constant for each example.

TABLE 1

Properties of First Support Member

| Plate Name | Material | Thick-ness | Hole Diameter | Number of Holes | Bounding Area Diameter | Open Area |
|---|---|---|---|---|---|---|
| Plate A | Perforated PET | 130 μm | Open (1.5 mm hole) | 1 | 1.5 mm | 100% |
| Plate B | Perforated PET | 130 μm | 100 μm | 85 | 1.5 mm | 37.8% |
| Plate C | Perforated PET | 130 μm | 50 μm | 99 | 1.5 mm | 11.0% |
| Plate D | Perforated PET | 130 μm | 25 μm | 99 | 1.5 mm | 2.8% |

TABLE 2

Properties of Second Support Member

| Plate Name | Material | Thick-ness | Hole Diameter | Number of Holes | Bounding Area Diameter | Open Area |
|---|---|---|---|---|---|---|
| Plate E | Perforated Metal | 250 μm | 55 μm | 7 | 1.5 mm | 3.2% |

TABLE 3

Standard Deviation of Insertion Loss (dB) by varying the First Support Member Before and After a WEP test

| Test Step | First Support Member | 200 Hz | 500 Hz | 1,000 Hz | 2,000 Hz | 5,000 Hz | Mean |
|---|---|---|---|---|---|---|---|
| | | | | Frequency (Hz) | | | |
| Before WEP test | Plate A | 1.26 | 0.70 | 0.36 | 0.11 | 0.56 | 0.60 |
| Before WEP test | Plate B | 0.71 | 0.36 | 0.25 | 0.27 | 0.81 | 0.48 |
| Before WEP test | Plate C | 0.84 | 0.78 | 0.78 | 0.78 | 0.80 | 0.79 |
| Before WEP test | Plate D | 1.10 | 1.04 | 1.07 | 1.12 | 1.38 | 1.14 |
| After WEP test | Plate A | 0.28 | 0.30 | 0.43 | 0.43 | 0.90 | 0.83 |
| After WEP test | Plate B | 0.05 | 0.05 | 0.02 | 0.06 | 0.26 | 0.09 |
| After WEP test | Plate C | 0.10 | 0.08 | 0.07 | 0.07 | 0.03 | 0.07 |
| After WEP test | Plate D | 0.04 | 0.04 | 0.09 | 0.29 | 1.02 | 0.30 |

The tested assemblies included one of the first support members (Plates A to D), an ePTFE membrane spaced 50 μm from the first support member (Plates A-D) and 50 μm from the second support member (Plate E). Plate E was utilized in all of the assemblies.

Plate A included a single aperture of 1.5 mm. As shown, the standard deviation of Insertion Loss (dB) by varying the First Support Member Before and After a WEP test resulted in the examples having a standard deviation of less than 0.8 dB.

Figure 2:
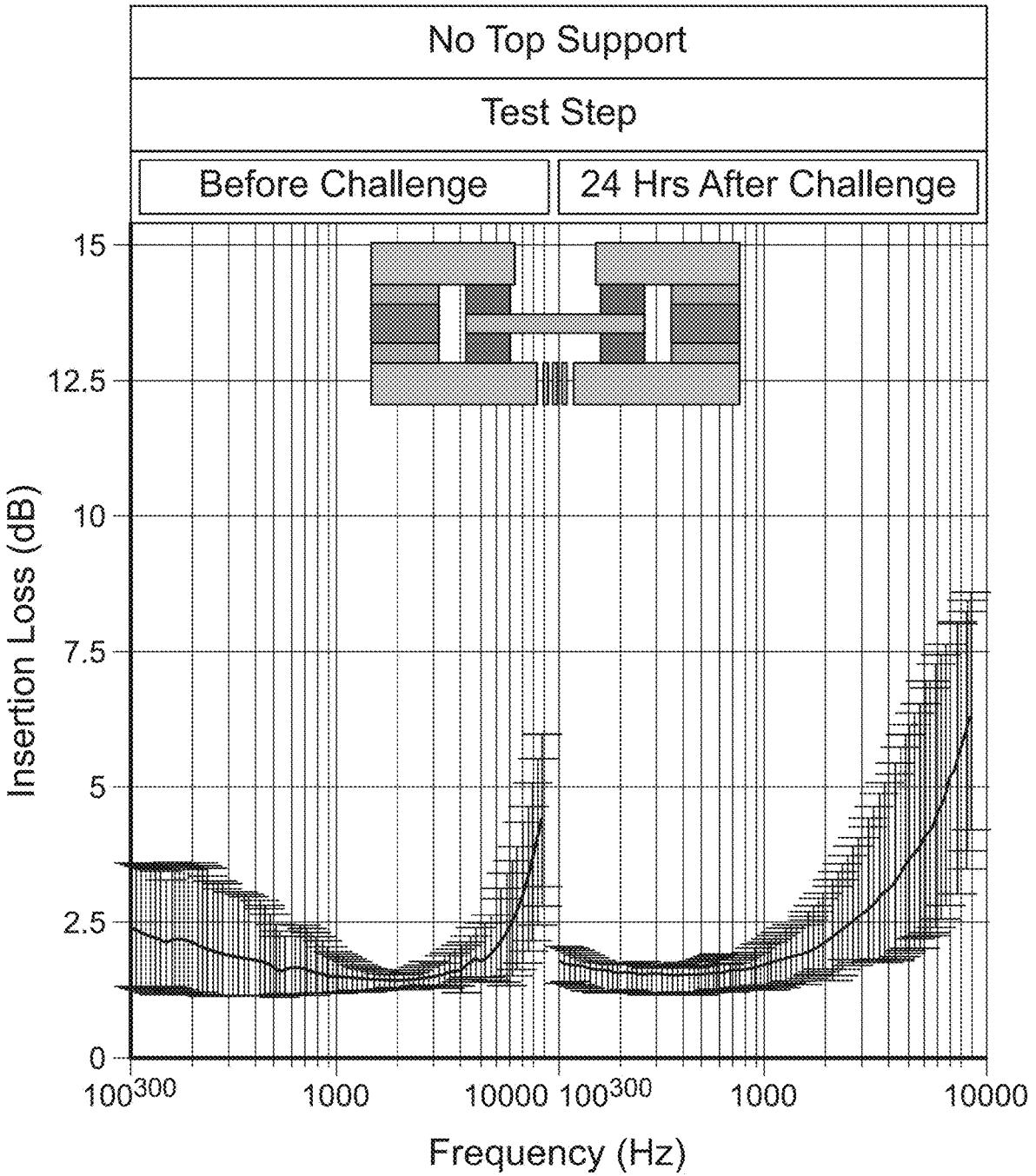
FIG. 2 is a plot of average insertion loss versus frequency, according to some embodiments.

FIG. 2 is a plot of average insertion loss versus frequency for the assembly including first support member as Plate A and second support member as Plate E, according to some embodiments. The horizontal axis is the frequency and insertion loss (dB) is the vertical axis.

Figure 3:
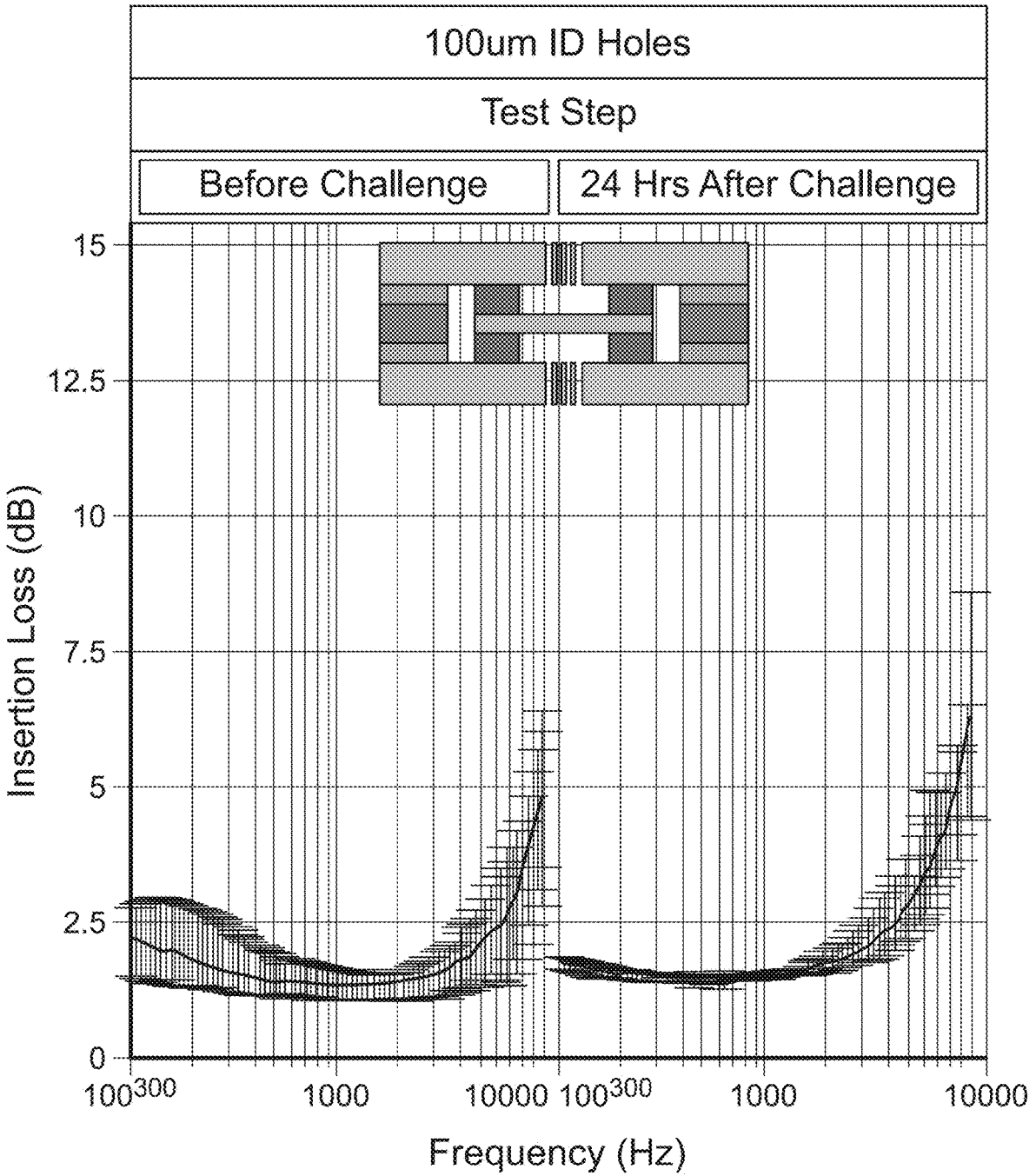
FIG. 3 is a plot of average insertion loss versus frequency, according to some embodiments.

FIG. 3 is a plot of average insertion loss versus frequency for the assembly including first support member as Plate B and second support member as Plate E, according to some embodiments. The horizontal axis is the frequency and insertion loss (dB) is the vertical axis.

Figure 4:
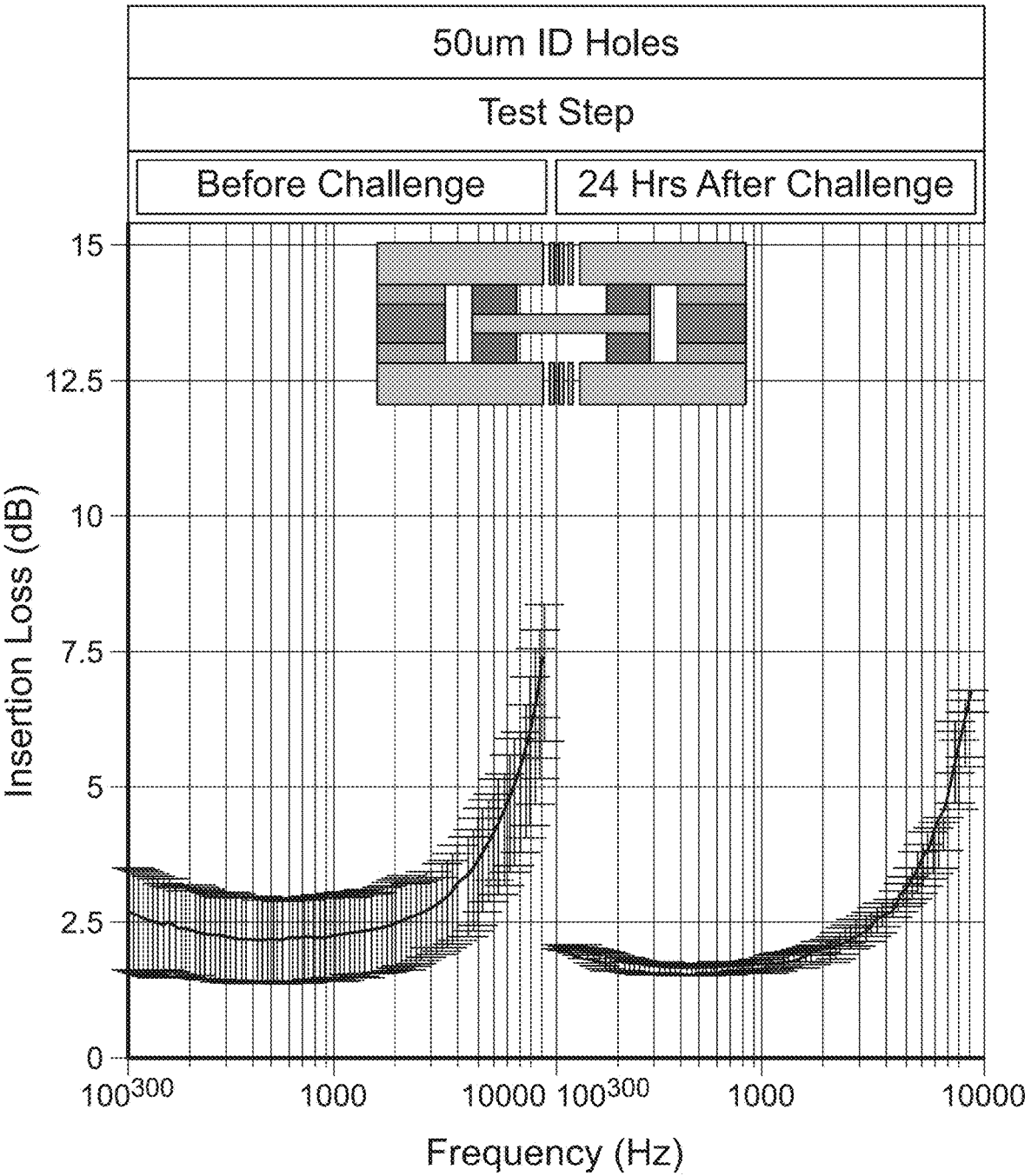
FIG. 4 is a plot of average insertion loss versus frequency, according to some embodiments.

FIG. 4 is a plot of average insertion loss versus frequency for the assembly including first support member as Plate C and second support member as Plate E, according to some embodiments. The horizontal axis is the frequency and insertion loss (dB) is the vertical axis.

Figure 5:
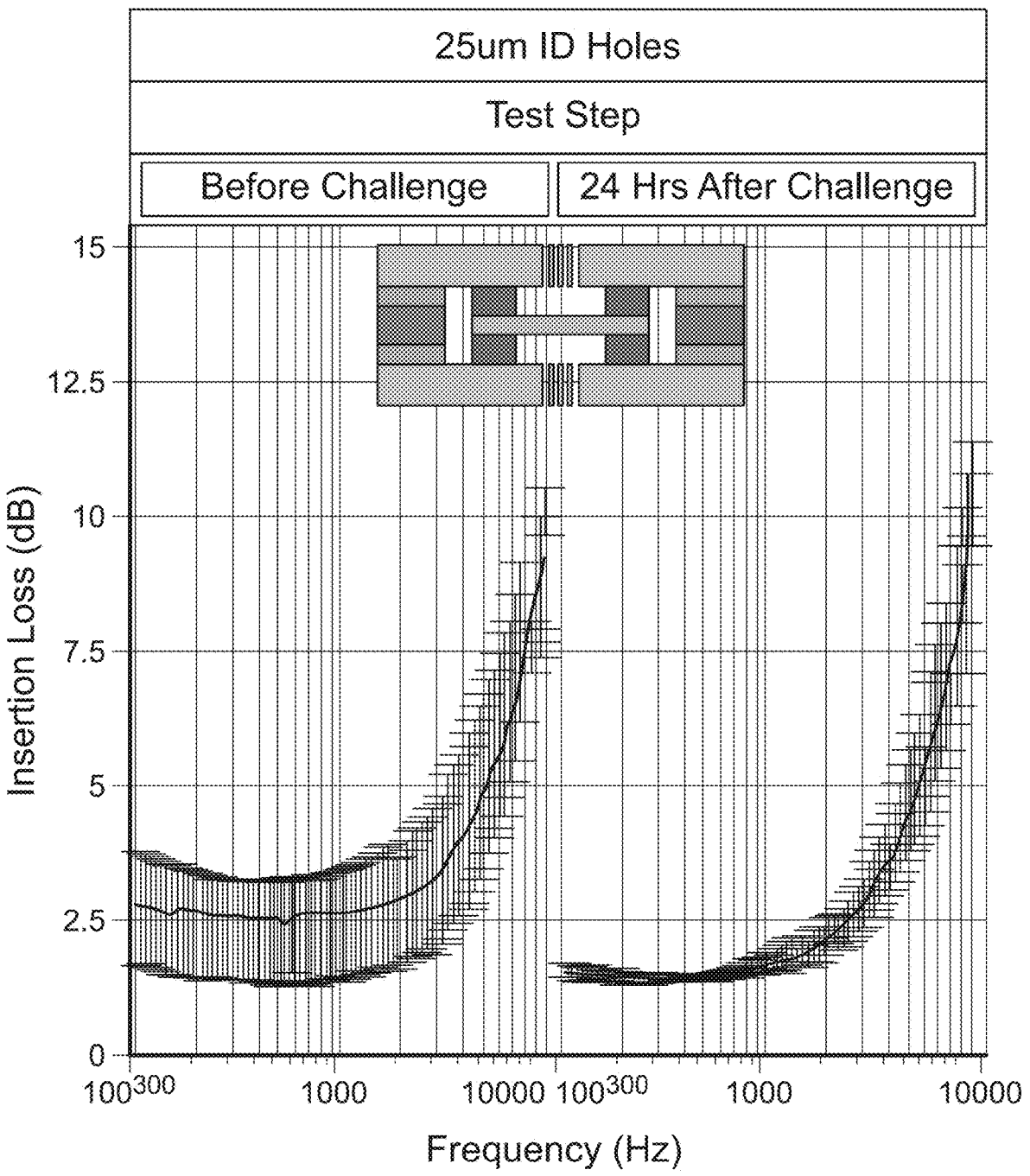
FIG. 5 is a plot of average insertion loss versus frequency, according to some embodiments.

FIG. 5 is a plot of average insertion loss versus frequency for the assembly including first support member as Plate D and second support member as Plate E, according to some embodiments. The horizontal axis is the frequency and insertion loss (dB) is the vertical axis.

As can be seen by the above figures, the average insertion loss in a frequency range up to 10,000 Hz changes based on a variation of the number of apertures and the size of the apertures (e.g., by varying Plates A-D). Compared to the combination including Plate A and Plate E, the other examples (Plates B-D with Plate E) exhibited reduced insertion losses after a WEP test.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

All prior patents, publications, and test methods referenced herein are incorporated by reference in their entireties.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. An assembly, comprising:
a first support member having a plurality of first apertures;
    wherein the first support member has a percentage open area that ranges from 10% to 40%;
a second support member having a plurality of second apertures;
a polymer membrane disposed between the first support member and the second support member;
    wherein the polymer membrane is spaced from the first support member by a first distance and is spaced from the second support member by a second distance;
        wherein the first distance is from 10 μm to 100 μm; and
        wherein the second distance is from 10 μm to 100 μm;
    wherein the assembly is configured to provide a standard deviation of insertion loss of between 0.05 and 0.3 dB over a frequency range of 200 Hz to 10,000 Hz after a water entry pressure (WEP) test.

2. The assembly of claim 1, wherein the polymer membrane comprises polyolefins, polyurethanes, polyesters, polyamides, polyketones, polysulfones, polycarbonates, fluoropolymers, or any combination thereof.

3. The assembly of claim 1, wherein at least one of the first support member or the second support member comprises a metal, a polymer, fiberglass, or any combination thereof.

4. The assembly of claim 1, wherein:
a diameter of at least one aperture of the plurality of first apertures is from 1 μm to 200 μm; and
a diameter of at least one aperture of the plurality of second apertures is from 1 μm to 200 μm.

5. The assembly of claim 1, wherein at least one of:
the plurality of first apertures includes 90 to 100 apertures; or
the plurality of second apertures includes 5 to 10 apertures.

6. The assembly of claim 1, comprising a plurality of adhesives, wherein:
the first distance is defined by a thickness of a first of the plurality of adhesives; and
the second distance is defined by a thickness of a second of the plurality of adhesives.

7. The assembly of claim 1, wherein the first support member and the second support member are different.

8. The assembly of claim 1, wherein at least one of:
the first support member is a rigid body that does not deform under 3 bar of water pressure; or
the second support member is a rigid body that does not deform under 3 bar of water pressure.

9. The assembly of claim 1, wherein the second support member is thicker than the first support member.

10. An assembly, comprising:
an acoustic device;
a first support member having a plurality of first apertures;
    wherein the first support member has a percentage open area that ranges from 10% to 40%;
a second support member having a plurality of second apertures; and
a polymer membrane disposed between the first support member and the second support member;
    wherein the polymer membrane is spaced from the first support member by a first distance and is spaced from the second support member by a second distance;

wherein the first distance is from 10 μm to 100 μm; and wherein the second distance is from 10 μm to 100 μm; and wherein the assembly is configured to provide a standard deviation of insertion loss of between 0.05 and 0.3 dB over a frequency range of 200 Hz to 10,000 Hz after a water entry pressure (WEP) test.

11. The assembly of claim 10, wherein the polymer membrane comprises expanded polytetrafluoroethylene (ePTFE).

12. The assembly of claim 10, wherein at least one of the first support member or the second support member comprises a metal, a polymer, fiberglass, or any combination thereof.

13. The assembly of claim 10, wherein:

a diameter of at least one aperture of the plurality of first apertures is from 1 μm to 200 μm, and a diameter of at least one aperture of the plurality of second apertures is from 1 μm to 200 μm.

14. The assembly of claim 10, wherein at least one of:

the plurality of first apertures includes 90 to 100 apertures; or the plurality of second apertures includes from 5 to 10 apertures.

15. The assembly of claim 10, comprising a plurality of adhesives, wherein:

the first distance is defined by a thickness of a first of the plurality of adhesives; and the second distance is defined by a thickness of a second of the plurality of adhesives.

16. The assembly of claim 10, wherein at least one of:

the first support member is a rigid body that does not deform under 3 bar of water pressure; or the second support member is a rigid body that does not deform under 3 bar of water pressure.

17. The assembly of claim 10, wherein the acoustic device is a speaker, a receiver, or any combination thereof.

18. The assembly of claim 10, wherein the first distance and the second distance are the same.

\* \* \* \* \*